Oct. 22, 1935.  J. A. ISBELL  2,017,972

BEARING FOR PRINTING PRESS COUPLES

Filed March 20, 1933  2 Sheets-Sheet 1

Inventor
John A. Isbell

Oct. 22, 1935.  J. A. ISBELL  2,017,972
BEARING FOR PRINTING PRESS COUPLES
Filed March 20, 1933  2 Sheets—Sheet 2
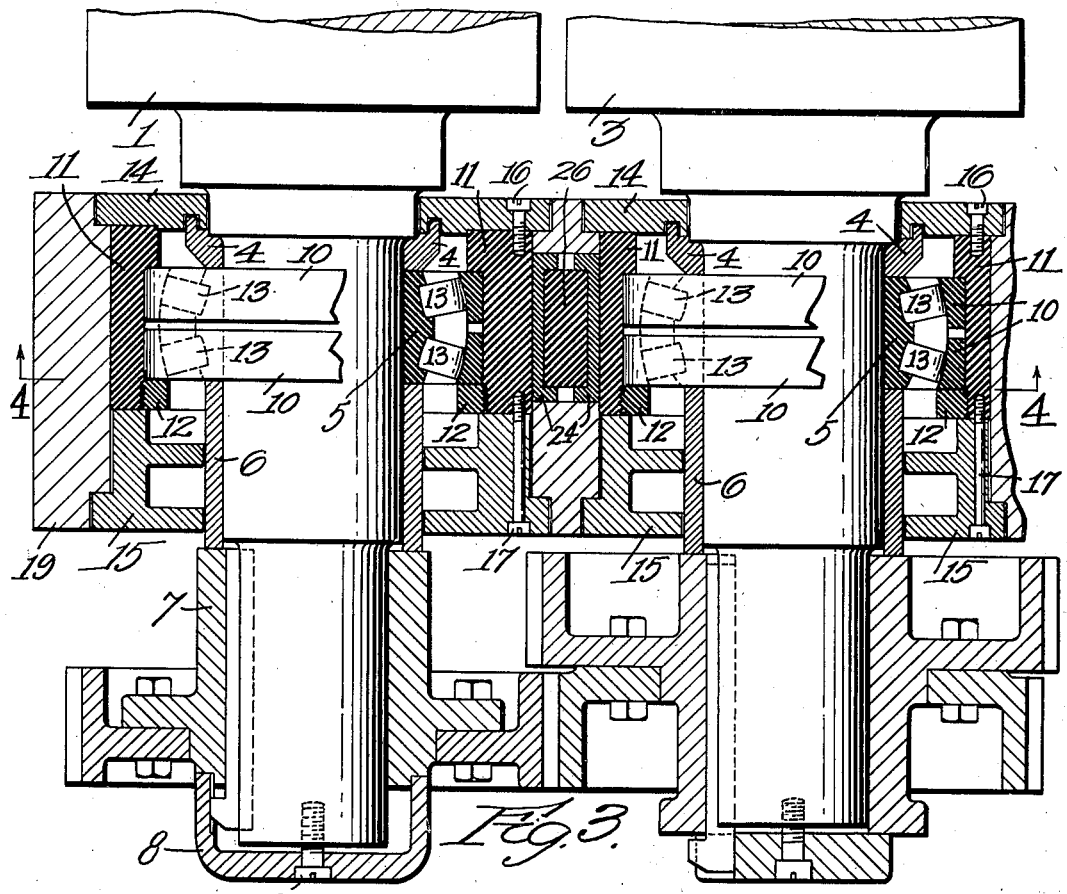
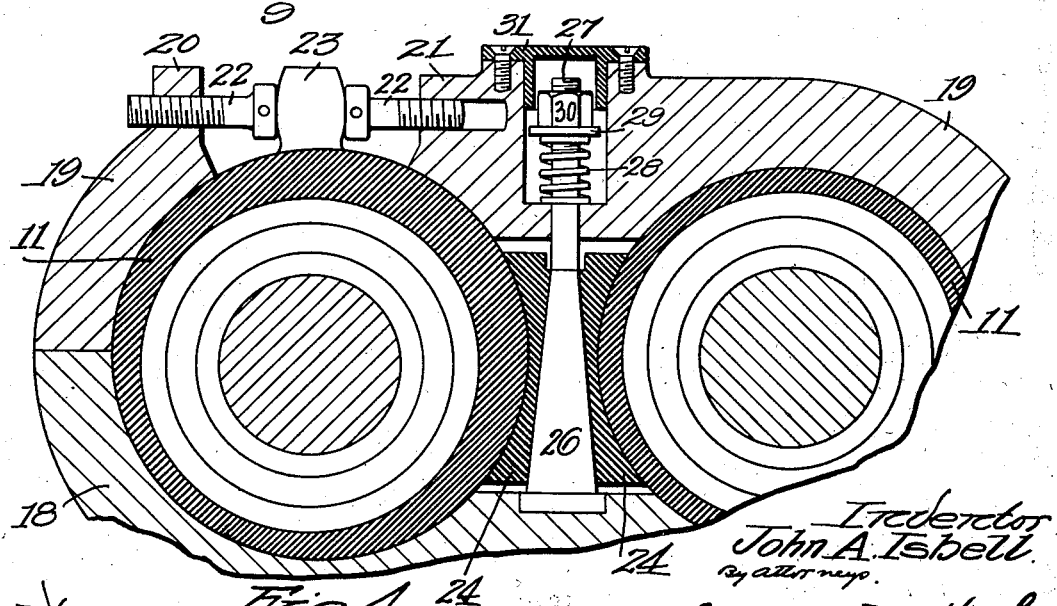

Patented Oct. 22, 1935

2,017,972

UNITED STATES PATENT OFFICE 2,017,972

BEARING FOR PRINTING PRESS COUPLES

John A. Isbell, Plainfield, N. J., assignor to Wood Newspaper Machinery Corporation, New York, N. Y., a corporation of Virginia Application March 20, 1933, Serial No. 661,819

2 Claims. (Cl. 308—60)

The principal objects of this invention are to provide a rigid bearing for each of the cylinders of a printing press couple or for any pair of cooperating cylinders or rolls; to provide means by which the cylinders will be held quite firmly in their bearings and by which the bearings will be fixed firmly in the frame; to provide means for preloading the rollers of the bearings, preferably consisting of a split outer race having means for drawing the two parts thereof together; to provide between the plate and impression cylinders a member for keeping the two bearings positively forced apart so that when the impression cylinder passes over the opening or space between two plates on the printing cylinder, both cylinders will be prevented from bouncing toward each other, thus preventing friaring or streaky printing; to provide the means between the plate and impression cylinders in the form of a wedge-like member, spring-seated in such a way that any vibration will tend to tighten it by forcing the wedge-like member in a direction toward its small end, in which case it will bear more firmly on the cylinder bearings and provide extreme rigidity; to provide means by which the wedge-shaped member will adjust itself automatically whenever it is necessary to shift one of the cylinders to adjust the impression, and generally to insure rigidity in the cylinder bearings.

Other objects and advantages of the invention will appear hereinafter.

Reference is to be had to the accompanying drawings, in which

Fig. 3 is a sectional view of the bearings on the line 3—3 of Fig. 1, and

Fig. 4 is a transverse sectional view on the line 4—4 of Fig. 3.

Figure 1:
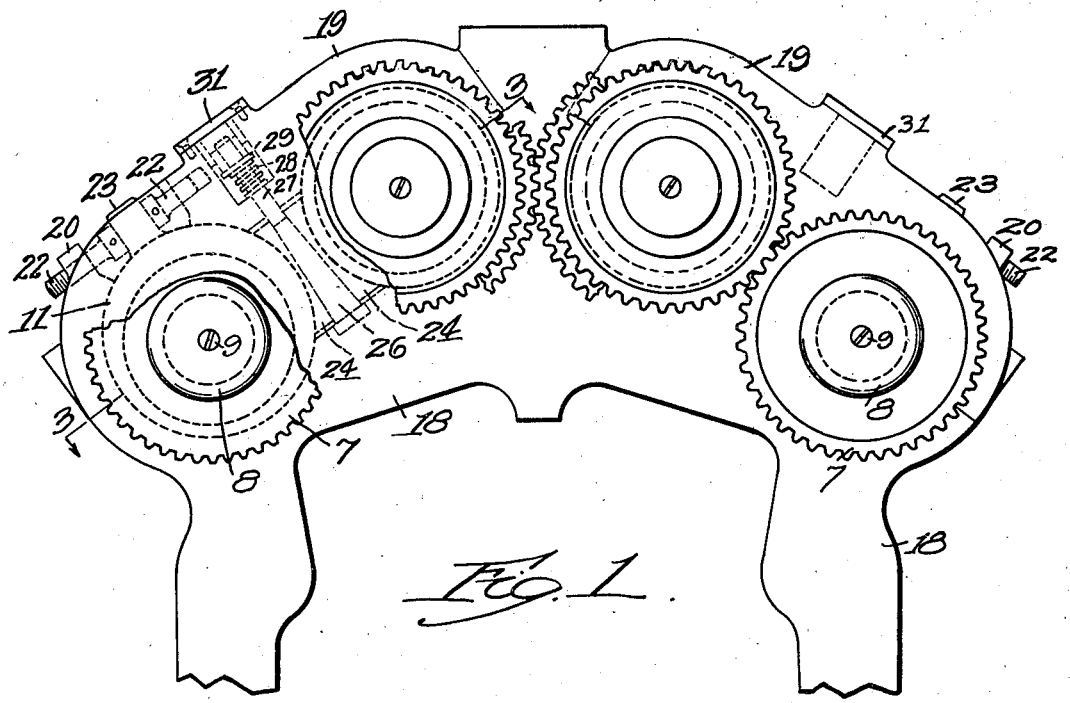
Fig. 1 is an end view of two couples of a printing press showing a preferred embodiment of this invention.
Figure 2:
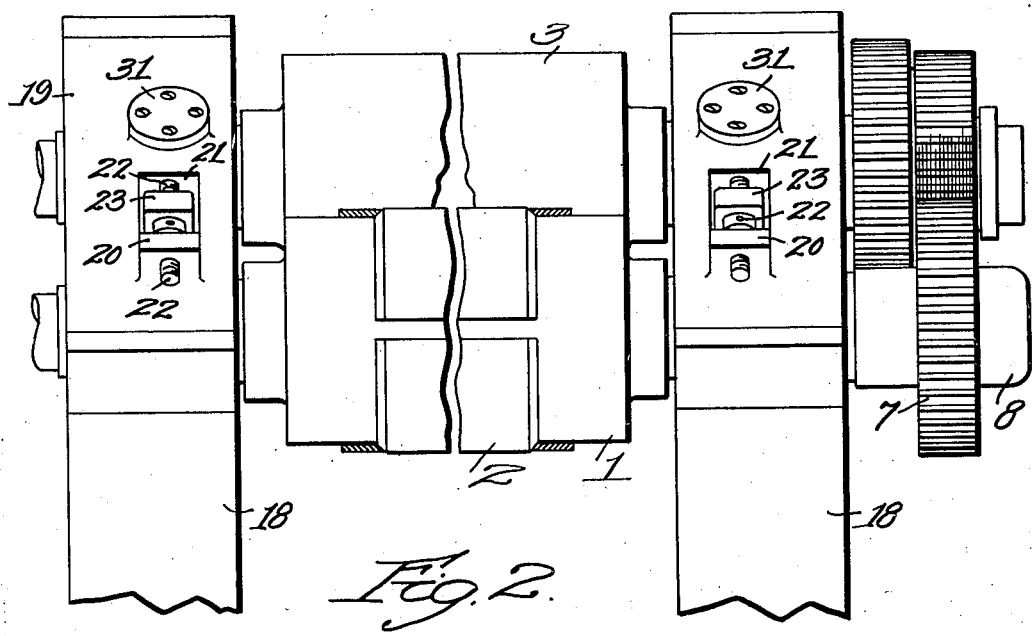
Fig. 2 is an elevation thereof, partly in section.

Although this invention is capable of use for the rigid supporting of any bearing and especially any pair of bearings between two rolls or cylinders that cooperate, it is designed particularly for use with the printing couple of a printing press. On account of the extreme accuracy necessary for good printing it is quite essential that the cylinders be mounted rigidly and held firmly in their bearings and also that the bearings be fixed firmly in the frame. Several schemes have been proposed for securing rigidity in the press bearings but this invention is an improvement thereon for the reasons mentioned above.

In the embodiment shown in the drawings, the plate cylinder 1 as usual is provided with means for clamping the plates 2 on its surface and it runs in cooperation with the usual impression cylinder 3. Mounted on the end of one of these cylinders or rather on its shaft is an oil seal 4. This is shown as mounted on the shaft of each of the cylinders. An anti-friction bearing is provided, shown as comprising an inner race 5 very firmly secured to the shaft of the cylinder, an outer race 10, which is split transversely, and bearing rollers 13. A spacer 6 is shown at the end of the inner race and the gear 7 clamped firmly in endwise relation by a cap 8 and cap screw 9. The two sections of the outer race 10, which of course is of a so-called conical construction, are shown as pressed together by the threaded cooperation of a collar 11 having a shoulder against which the end of the outer race is located and a ring 12 at the end of the anti-friction bearing. This threaded connection can be adjusted until a predetermined pressure is exerted on the rollers 13. In other words, these rollers are preloaded. The construction of these rollers in this way insures a rigid support for the cylinders 1 and 3 by the roller bearings out to the collar 11. End rings 14 and 15 are shown securely fixed to the collars 11 by cap screws 16 and 17 respectively. This construction is shown on the end of the impression cylinder as well as on the plate cylinder. Of course, it will be understood that these bearings and cooperating parts are duplicated on the other end of each cylinder.

With the rigid support out as far as the collar 11, this collar is very accurately fitted in the frame 18 and cap 19 for the bearing. However, it is necessary to provide impression adjustment on at least one of these cylinders because it is necessary to adjust the impression to get proper printing on account of the relatively soft packing used on the impression cylinder. The bearing cap 19 is provided with horns 20 and 21 integrally mounted thereon which provide supports for a pair of screws 22 in alignment with each other and having heads bearing on the opposite sides of a radial projection 23 which constitutes an integral part of the collar 11. The roller bearing on the end of one of the cylinders, preferably the plate cylinder, is eccentrically mounted by making that collar 11 eccentric so that any motion of the projection 23 circumferentially tends to throw the plate cylinder toward or away from the impression cylinder.

Recesses are cut in the frame 18 and cap 19 to accommodate arcuate shoes 24 which are mounted between the collars 11 of the plate and